No. 725,083. PATENTED APR. 14, 1903.
F. R. HOLDEN.
ROOT EXTRACTOR.
APPLICATION FILED JULY 16, 1902.
NO MODEL.
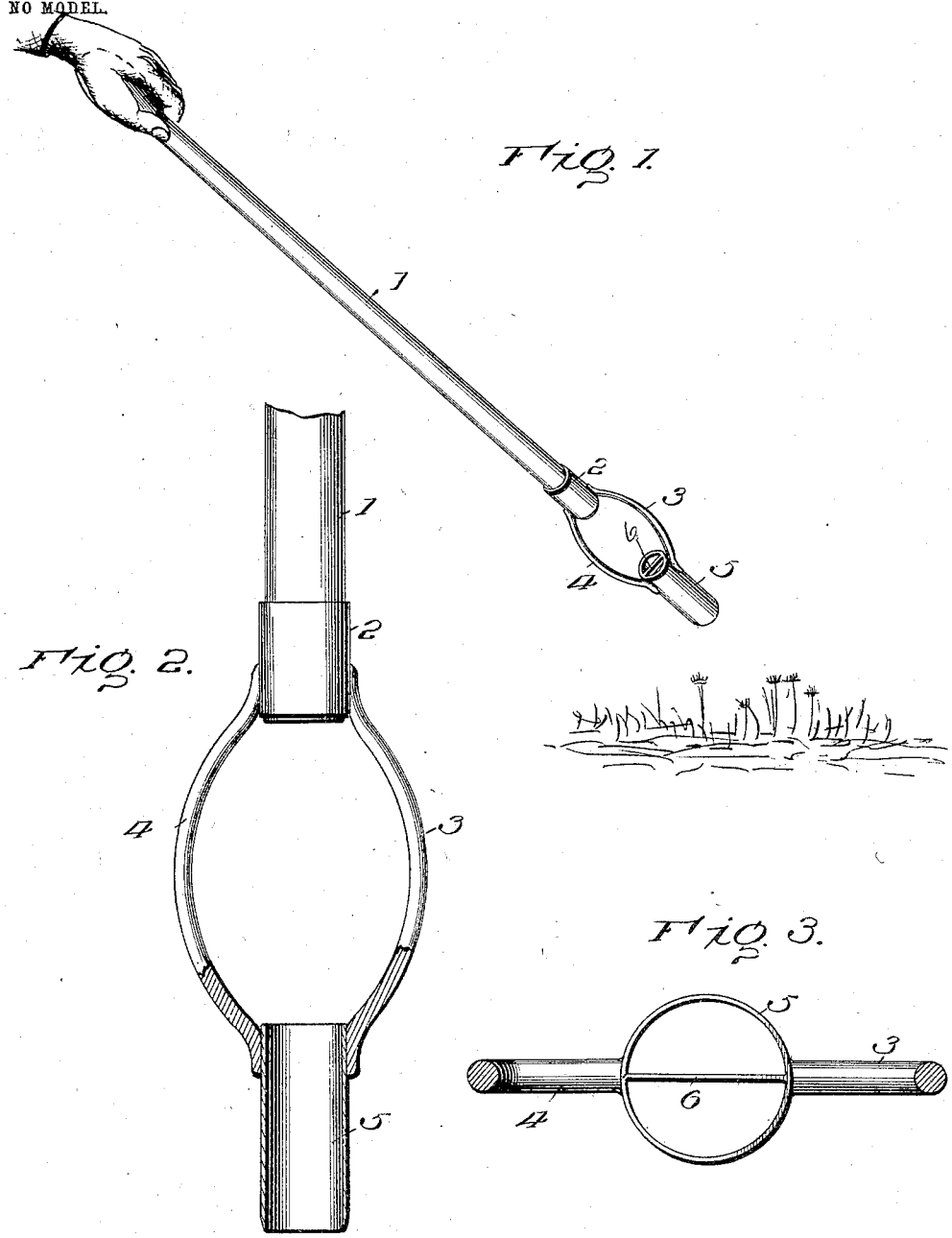

UNITED STATES PATENT OFFICE.

FRANKLIN R. HOLDEN, OF EVANSTON, ILLINOIS.

ROOT-EXTRACTOR.

SPECIFICATION forming part of Letters Patent No. 725,083, dated April 14, 1903.

Application filed July 16, 1902. Serial No. 115,823. (No model.)

*To all whom it may concern:*

Be it known that I, FRANKLIN R. HOLDEN, a citizen of the United States, residing at Evanston, in the county of Cook and State of Illinois, have invented certain new and useful Improvements in Root-Extractors; and I do hereby declare the following to be a full, clear, and exact description of the invention, such as will enable others skilled in the art to which it appertains to make and use the same.

My invention relates to root-extractors designed more particularly for removing from a lawn or other location the roots of obnoxious plants, as dandelion-roots, wild onions, dock, or the like; and my invention consists of certain novel features of combination and construction of parts, the preferred form whereof will be hereinafter clearly set forth, reference being had to the accompanying drawings, which are made a part of this application, and in which—

Figure 1 is a perspective view of my invention complete ready for use. Fig. 2 shows a longitudinal section of the cutting part of my root-remover with the transverse knife carried by the upper end thereof removed. Fig. 3 is a top plan view showing a modified construction which may be employed.

In order to clearly refer to or describe the various details of my invention and elements deemed necessary to coöperate therewith, numerals will be employed, the same numeral applying to a similar part in all the views.

Referring to the numerals on the drawings, 1 represents a handle of any preferred length, to the lower end of which I connect the socket 2, having the downwardly and outwardly inclined bow-shaped parallel arms 3 and 4, which are integrally formed with or otherwise connected to said socket and also to the cutting-thimble or tubular cutter 5, which is preferably cylindrical in shape, though very slightly larger in diameter at its lower end than at its upper end, the lower edge being properly sharpened to insure that it may be readily pushed into the soil or through roots or the like for the purpose of removing the central root or body portion of the plant.

The instrument may be readily applied to use by simply placing the sharpened free end of the tubular cutter 5 so as to surround the growing weed to be removed, when a downward thrust upon the handle will sink the cutter around the root and a withdrawal of the cutter will bring with it the plant and its central root within the tubular cutter, when the operation may be repeated upon another plant, and the result will be that the tubular cutter will be buried in the soil surrounding the root, as before, when the pressure upon the root within the tubular cutter previously extracted will force said root forward out of the open end, leaving it to fall upon the ground or to be gathered and otherwise disposed of.

In some instances I prefer to provide for the upper end of the tubular cutter a knife or a plurality of knives, as indicated by the numeral 6, said knife being secured in position in any preferred way, preferably removably secured for the purpose of enabling it to be sharpened. By thus providing a knife or knives 6 the root which is forced upward will be sliced and severed into two or more portions, and thereby insure its destruction against further growth.

It will be understood that for cheap construction the socket 2 may be very cheaply formed, though in some instances said socket may be internally threaded, if desired.

My improved root-extracting instrument may be made of any preferred size and of any desired material deemed most suitable for all the various purposes for which such an appliance may be found useful.

It is thought that the instrument without the knife 6 will be found very desirable for removing beets and other deep-growing roots, it being understood that the tubular cutter shall be made of proper size to surround the beet without injury thereto. The instrument will therefore be found useful for a great variety of purposes, and while I have described the preferred combination and construction of parts I wish to comprehend in this application all substitutes and equivalents as may be considered as falling fairly within the scope of my invention.

Believing that the advantages and manner of using my improved root-extractor will be made fully apparent from the foregoing specification considered in connection with the accompanying drawings, further reference is deemed unnecessary.

Having thus fully described my invention, what I claim as new, and desire to secure by Letters Patent, is—

The herein-described root-extracting appliance, comprising a suitable socket; a handle fitting in said socket; outwardly and inwardly curved arms extending from said socket; a tubular cutter connected to the inwardly-curved ends of said arms and a knife extending diametrically across the upper end of said tubular cutter and having its lower edge sharpened as set forth.

In testimony whereof I affix my signature in presence of two witnesses.

FRANKLIN R. HOLDEN.

Witnesses:
JOHN GAERTNER,
LE ROY MCMURRAY.